Patented Mar. 23, 1926.

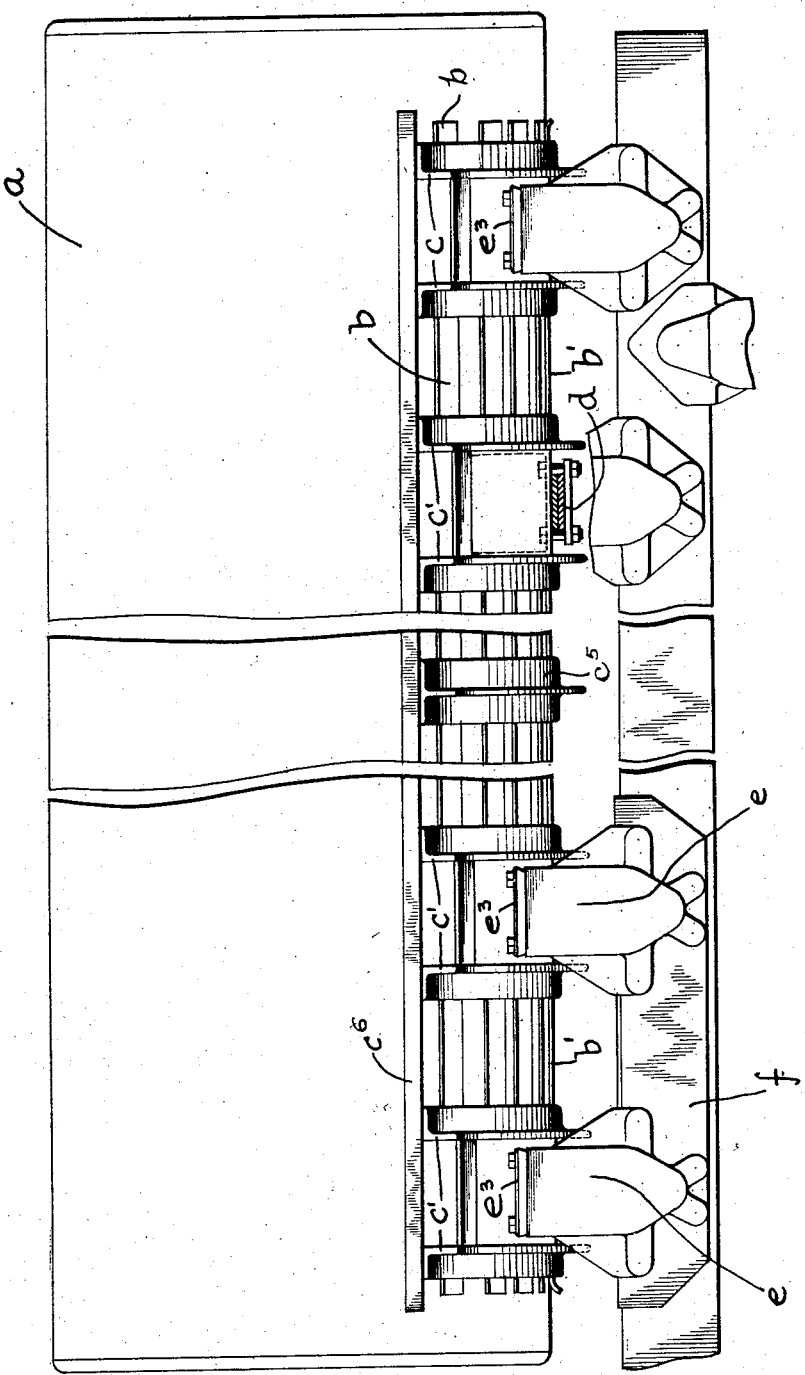

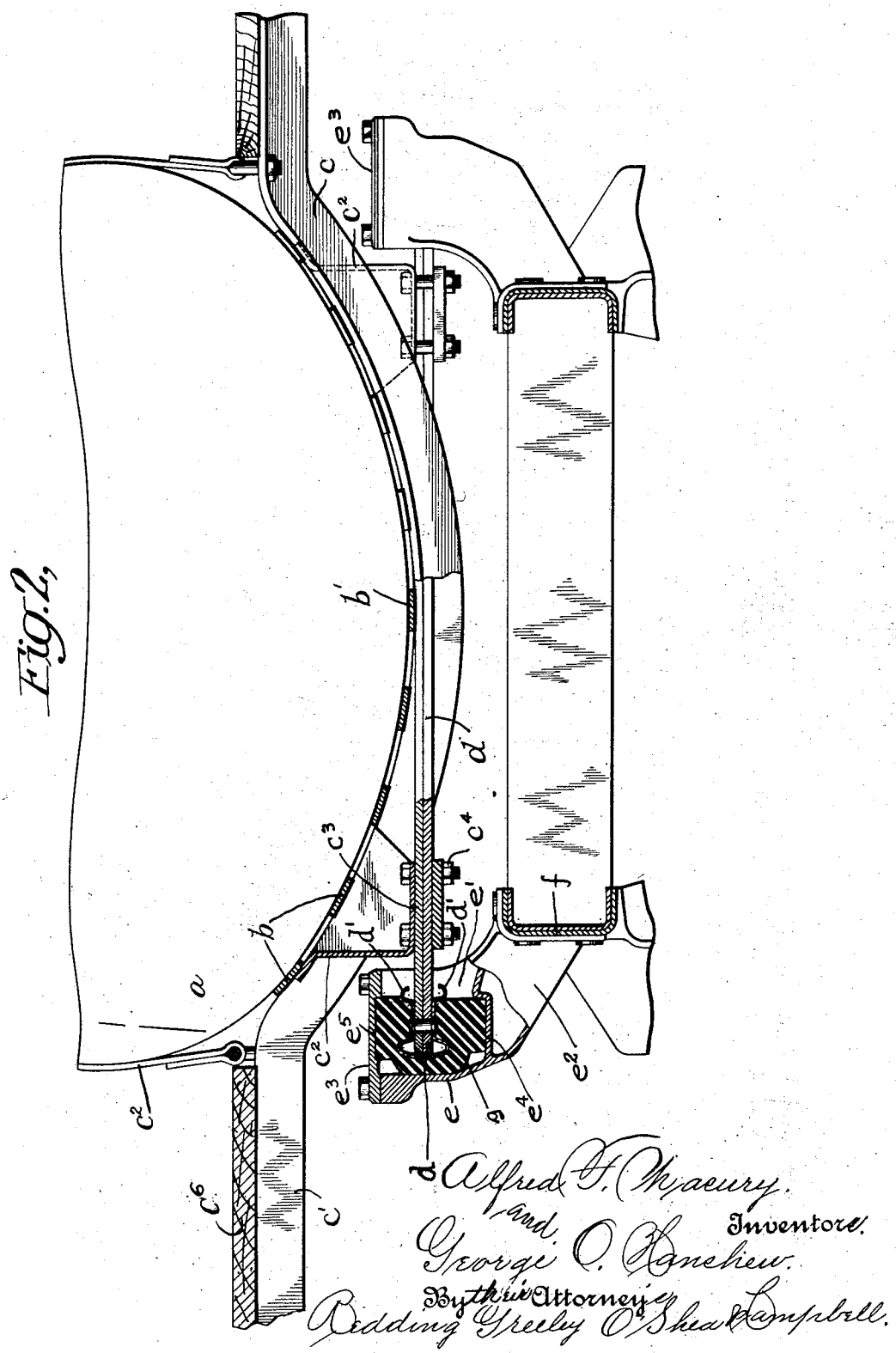

1,578,152

UNITED STATES PATENT OFFICE.

ALFRED F. MASURY, OF NEW YORK, AND GEORGE O. HANSHEW, OF BROOKLYN, NEW YORK, ASSIGNORS TO INTERNATIONAL MOTOR COMPANY, OF NEW YORK, N. Y., A CORPORATION OF DELAWARE.

CUSHIONED SUPPORT FOR THE BODIES OF VEHICLES.

Application filed June 18, 1924. Serial No. 720,751.

*To all whom it may concern:*

Be it known that we, ALFRED F. MASURY and GEORGE O. HANSHEW, residing, respectively, in the borough of Manhattan, of the city of New York, in the State of New York, and in the borough of Brooklyn, of the city of New York, in the State of New York, have invented certain new and useful Improvements in Cushioned Supports for the Bodies of Vehicles, of which the following is a specification, reference being had to the accompanying drawings, forming a part hereof.

This invention relates to a yielding mounting for a body with respect to a vehicle frame whereby latitude for relative movement therebetween is provided. In the co-pending application of Fred L. Lipcot Serial No. 696,931 filed March 5, 1924, there is disclosed non-metallic yielding connections between relatively movable parts of a vehicle for the purpose of cushioning the shocks and vibrations impressed upon one such part to prevent their transmission in whole or in part to another vehicle part. More specifically the prior invention contemplates the provision of a plurality of arms carried with one such part, say the body, and adapted to be engaged by yielding non-metallic material suitably supported on the other part, say the chassis frame. The present invention contemplates an improvement of the aforementioned invention and is particularly applicable for tank mountings whereby the shocks impressed upon the tank by the liquid surging back and forth therein may be absorbed or cushioned and not transmitted with undiminished intensity to the chassis frame. The present invention also contemplates the provision of a plurality of resilient arms extending outwardly transversely of the vehicle body and engaged by blocks of yielding non-metallic material confined upon the chassis frame. Such a support provides most efficaciously a non-rigid connection between the body and chassis frame whereby the chassis is free to weave when traveling over inequalities in the road and the stresses arising therefrom are not impressed upon the body. The present invention also has to do with an improved method of mounting a tank in connection with the resilient arms. In order that the invention may be clearly understood and readily carried into effect the same will now be described more fully with reference to the accompanying drawings illustrating a preferred embodiment thereof and in which:

Figure 1 is a view in side elevation of the non-rigid connection and support according to the present invention when adapted for use with a tank to be carried upon the chassis of a motor vehicle.

Figure 2 is a fragmentary view in transverse vertical section, parts being broken away in the interest of clearness.

While the invention has been illustrated as applied to a tank mounting it will be understood that some aspects thereof are applicable in any situation in which any kind of body is to be mounted upon a vehicle frame with provision for relative movement therebetween. The tank $a$ is shown as supported throughout its entire length upon a plurality of longitudinally extending slats $b$ which are carried upon transverse supports or saddles $c$ suitably curved to conform with the lower surface of the tank and extending beyond the sides thereof as at $c'$ to form supports for a longitudinal platform or runway $c^6$ upon either side of the vehicle. The tank is rigidly secured in proper position by means of straps $c^2$ passing over the top of the tank and secured at their ends to the transverse supporting members $c$. Extending downwardly from the supports $c$ at either side thereof are brackets $c^2$ whereof the lower marginal surface $c^3$ terminates substantially in the plane of the lower marginal surface of the lowest slat $b'$. To each pair of brackets $c^2$ are secured elements $d$ which are preferably resilient such as springs or the like. These extend transversely of the tank and engage at their midpoint with the lowermost slat $b'$. These transverse members may be secured in any convenient manner as by the bolts $c^4$ to the brackets $c^2$ and extend outwardly therefrom on either side to enter the housings $e$ through an opening $e'$ in the adjacent faces thereof, respectively. The housings are supported in any convenient manner as by the brackets $e^2$ upon the vehicle frame $f$. The top of each housing is open and is adapted to be closed by a cover $e^3$. Within the housings are confined blocks $g$ of yielding non-metallic material which engage the ends of the resilient members $d$. It is preferred that the blocks be formed of rubber and retained within the housings under compression whereby the resiliency, strength and wearing qualities of the blocks are improved. If desired and in order to facilitate the confinement of the blocks in the desired relation seats $e^4$, $e^5$, may be formed in each housing and cover $e^3$, respectively, and co-operating seats $d'$, $d'$ may also be formed on the ends of the resilient members $d$. It will be understood that the members $d$ need not, in every situation, extend completely across the body but in lieu thereof individual arms may be secured to the brackets $c^2$ and extend outwardly therefrom as a modification of the invention.

While the connections hereinbefore described may be disposed in any desired manner upon opposite sides of the body and frame it is preferred to arrange a pair of such transverse resilient members and their associated non-metallic connections at either end of the vehicle as clearly indicated in Figure 1, the slats $b$ which extend throughout the length of the tank forming sufficient support at the mid portion thereof. If desired an individual supporting cradle or the like $c^5$ may engage the slats at the mid portion thereof. The blocks of yielding non-metallic material which, as will be evident, form the sole connection and support between the body and the vehicle frame flex upon the imposition of stresses thereon and permit a degree of relative movement between the body and the frame. The resilient arms $d$ further contribute to this end by yielding upon the imposition of stresses thereupon so that the mounting taken as a whole will be found to permit, within prescribed limits, relative movement to accommodate the connection for weaving of the vehicle frame.

It will thus be seen that a mounting has been provided for the body which will permit limited movement thereof with respect to a vehicle frame whereby the rigidity of the frame resulting from the accepted manner of carrying a body therewith is avoided and the shocks and stresses impressed thereon are cushioned or absorbed and prevented from being transmitted in undiminished intensity to the body or vice versa.

Various modifications may be made in the disposition and arrangement of the supports forming the subject matter of the present invention and no limitation is intended by the foregoing description except as indicated in the appended claims.

What we claim is:

1. In a motor vehicle, the combination with a frame carried with a running gear and a tank, of a plurality of saddles bearing the tank and disposed at opposite ends thereof respectively, resilient elements engaged with said saddles at their mid points and extending outwardly transversely thereof, a plurality of housings carried with the vehicle frame and having an open side into which said arms extend respectively, and blocks of yielding non-metallic material retained within the housings.

2. In a motor vehicle, the combination with a frame carried with a running gear and a tank, of a plurality of saddles bearing the tank and disposed at opposite ends thereof respectively, resilient elements engaged with said saddles at their mid points and extending outwardly transversely thereof, a plurality of housings carried with the vehicle frame and having respectively, open sides into which the ends of the arms extend, seats formed on the arms, co-operating seats formed in the housings, and blocks of yielding non-metallic material retained between the seats under compression.

3. A saddle upon the chassis of a vehicle for bearing the body comprising transverse saddle members, longitudinal members carried on the transverse members and forming a seat for the body, means to secure the body to the saddle, downwardly projecting brackets mounted on the transverse members and extending substantially to the plane of the bottom of the saddle, transverse resilient members mounted on the brackets and extending outwardly therefrom whereby said members support the bottom portions of the saddle, housings mounted on the chassis for housing the outwardly extending portions of the resilient members, and means in the housings for cushioning the resilient members.

This specification signed this 14 day of June, A. D. 1924.

ALFRED F. MASURY.
GEORGE O. HANSHEW.